United States Patent
Koga et al.

[11] Patent Number: 5,997,107
[45] Date of Patent: Dec. 7, 1999

[54] REGENERATIVE CONTROL APPARATUS OF ELECTRIC VEHICLE, WHICH OBTAINS REGENERATIVE TORQUE FOR BRAKE FROM MOTOR FOR RUNNING

[75] Inventors: Hisamitsu Koga; Tomiji Owada, both of Okazaki; Masaaki Kato, Kyoto; Nobuyuki Kawamura, Okazaki; Naotake Kumagai, Tokyo; Nobuya Furukawa, Okazaki, all of Japan

[73] Assignee: Mitsubishi Jidosha Kogyo Kabushiki Kaisha, Tokyo, Japan

[21] Appl. No.: 09/201,488

[22] Filed: Nov. 30, 1998

Related U.S. Application Data

[62] Division of application No. 08/613,034, Mar. 8, 1996, Pat. No. 5,879,062.

[30] Foreign Application Priority Data

Mar. 10, 1995 [JP] Japan .................................... 7-050695

[51] Int. Cl.$^6$ ...................................................... B60L 7/24
[52] U.S. Cl. ............................. 303/152; 303/20; 180/165
[58] Field of Search ........................... 303/3.15, 20, 152; 180/65.1–65.5, 165

[56] References Cited

U.S. PATENT DOCUMENTS

| | | |
|---|---|---|
| 5,358,317 | 10/1994 | Cikanek . |
| 5,362,135 | 11/1994 | Riddiford et al. . |
| 5,457,363 | 10/1995 | Yoshii et al. . |
| 5,511,859 | 4/1996 | Kade et al. . |
| 5,542,754 | 8/1996 | Aoki et al. ................................ 303/152 |
| 5,549,371 | 8/1996 | Konaga et al. ........................... 303/152 |
| 5,615,933 | 4/1997 | Kidston et al. ........................... 303/152 |
| 5,632,534 | 5/1997 | Knechtges ................................ 303/152 |

FOREIGN PATENT DOCUMENTS

| | | |
|---|---|---|
| 47-024012 | 10/1972 | Japan . |
| 1058203 | 4/1989 | Japan . |
| 1126103 | 5/1989 | Japan . |
| 6253406 | 9/1994 | Japan . |

*Primary Examiner*—Matthew C. Graham
*Attorney, Agent, or Firm*—John P. White; Cooper & Dunham LLP

[57] ABSTRACT

According to the present invention, the operating amount of the brake is detected, and the target value of the regenerative torque is set in accordance with the detected operating amount. In the meantime, the change in the detected operating amount along with time is detected, and the rise speed of the regenerative torque is set in accordance with the detected change along with time. The regenerative torque is controlled in accordance with the set target value of the regenerative torque and the set rise speed.

9 Claims, 8 Drawing Sheets

LARGER THAN ←——→ SMALLER THAN
TARGET VALUE         TARGET VALUE

| Δθ \ ΔGa | E | NB | NS | ZO | PS | PB | |
|---|---|---|---|---|---|---|---|
| S | PB |  |  |  |  |  | |
|  | PS | NS |  | ZO |  |  | DECREASE ↑ |
|  | ZO | NS | NS | ZO | PS | PS |  |
|  | NS |  |  | ZO |  | PS | ↓ INCREASE |
|  | NB |  |  |  |  |  | |
| M | PB |  |  | PS |  |  | |
|  | PS | NB |  | ZO |  |  | DECREASE ↑ |
|  | ZO | NM | NS | ZO | PS | PM |  |
|  | NS |  |  | ZO |  | PB | ↓ INCREASE |
|  | NB |  |  | NS |  |  | |
| B | PB |  |  | PM |  |  | |
|  | PS | NB |  | ZO |  |  | DECREASE ↑ |
|  | ZO | NB | NS | ZO | PS | PB |  |
|  | NS |  |  | ZO |  | PB | ↓ INCREASE |
|  | NB |  |  | NM |  |  | |

F I G. 16

REGENERATIVE CONTROL APPARATUS OF ELECTRIC VEHICLE, WHICH OBTAINS REGENERATIVE TORQUE FOR BRAKE FROM MOTOR FOR RUNNING

This is a division of application Ser. No. 08/613,034, filed Mar. 8, 1996, now U.S. Pat. No. 5,879,062.

BACKGROUND OF THE INVENTION

1. Field of the Invention

The present invention relates to a regenerative control apparatus of an electric vehicle, which is driven by a battery power generated by a motor for running the vehicle.

2. Description of the Related Art

In an electric vehicle a dynamic power of which is an electric motor, when its brake pedal is stepped on, a mechanical braking power and an electrical regenerative braking power based on the power generating effect of the motor, are applied at the same time, and the energy for the regenerative brake, that is a so-called regenerative torque, is stored in the battery power. Further, in order to achieve an appropriate braking operation, the step-on (actuating) amount of the brake pedal is detected, and the value of the regenerative torque is adjusted in accordance with a results of the detection.

For example, according to the technique disclosed in Jap. Pat. Appln. KOKAI Publication No. 47-24012, a brake force is sensed from the step-on amount of the brake pedal or the leg-power applied on the brake pedal, and a regenerative torque, which is in proportional to the brake force, is determined.

Or, according to the technique disclosed in Jap. Pat. Appln. KOKAI Publication No. 1-58203, the value of a regenerative torque is obtained by multiplying a regenerative torque command value which is set in accordance with the step-on amount of the brake pedal, with the maximum regenerative torque in accordance with the number of rotation of the motor for that step-on amount.

Or, according to the technique disclosed in Jap. Pat. Appln. KOKAI Publication No. 1-126103, a regenerative torque is determined in accordance with the operation amount of the brake operating means and the operation acceleration speed of the brake operating means.

It should be noted that there is a time lag mainly due to a mechanical factor, from the point when the braking operation is started, and to the point a regenerative torque is actually generated. If there is an excessively long time lag, the braking is delayed, whereas if there is an excessively short time lag, an excessively quick service is always obtained, resulting in an uncomfortable vehicle ride.

With the techniques of the above-described documents, a time lag between when the brake is operated and when the regenerative torque for braking is actually generated, is set always at constant, and therefore an optimum brake response cannot be obtained.

SUMMARY OF THE INVENTION

The object of the present invention is to provide an apparatus capable of varying the time lag from the point when the brake is operated to the point when the braking due to a regenerative torque is actually generated, to be set to an optimal value in consideration of the running status and the comfortable vehicle ride, thereby obtaining a good brake response, and to improve the running safety and the comfortable vehicle ride.

In order to achieve the above-described object, the present invention provides a regenerative control apparatus of an electric vehicle, which obtains a regenerative torque for braking from the motor for running the vehicle, at the time of operation of the brake, said apparatus comprising:

a first detection unit for detecting an operating amount of the brake;

a first setting unit for setting a target value of the regenerative torque in accordance with the operating amount detected by the first detection unit;

a second detection unit for detecting a change along with time, in the operating amount detected by the first detection unit;

a second setting unit for setting a rise speed of the regenerative torque, in accordance with the change along with time, detected by the second detection unit; and a control unit for controlling the regenerative torque in accordance with the target value of the regenerative torque set by the first setting unit and the rise speed of the regenerative torque set by the second setting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The first embodiment of the present invention will now be described with reference to accompanying drawings.

Figure 2:
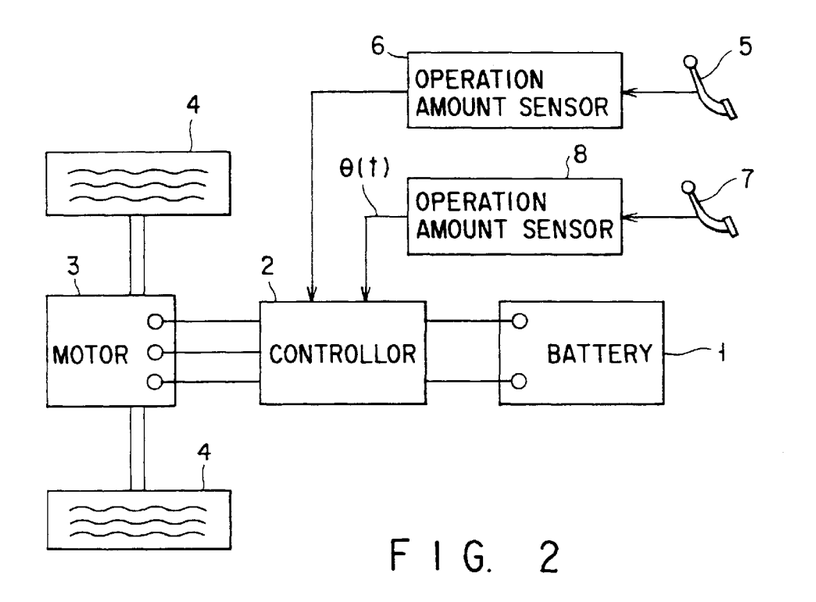
FIG. 2 is a diagram showing the structure of a main portion of an electric vehicle in connection with the first and second embodiments.

The main portion of an electric vehicle is shown in FIG. 2.

As can be seen in FIG. 2, a motor used for running the vehicle is connected to a battery 1 via a controller 2, and a pair of driving wheels 4 are mounted on the rotation shaft of the motor 3.

An operation amount sensor 6 is set on an acceleration pedal 5. The acceleration pedal 5 is designed to adjust the running speed of the vehicle, that is, the rotation speed of the motor 3. The operating (actuating) amount sensor 6 detects the step-on operating amount of the acceleration pedal 5. The result data of the detection of the operating amount sensor 6 is supplied to the controller 2.

An operating amount sensor 8 is set on a brake pedal 7. The brake pedal 7 is coupled with a brake mechanism, to be able to apply a mechanical braking action on the vehicle. The operating amount sensor 8 detects the step-on actuating amount θ(t) (unit in mm) of the brake pedal 7. The result data of the detection of the operating amount sensor 8 is supplied to the controller 2.

The controller 2 converts a power voltage of the battery 1 into a voltage of a predetermined frequency, and outputs the voltage to the motor 3 as a driving power. Further, the controller 2 takes in the energy of the regenerative brake from the motor 3, that is, so-called regenerative torque, and converts the torque into a voltage for charging the battery 1, to be output.

Figure 1:
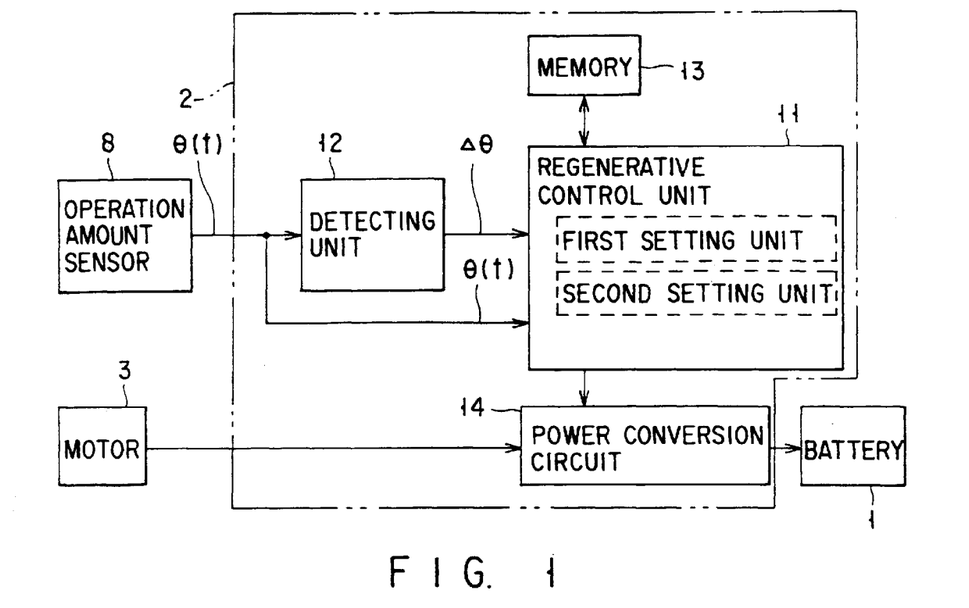
FIG. 1 is a block diagram showing a main portion of the first embodiment.

The structure of the controller 2 used for the control of a regenerative torque is shown in FIG. 1.

As can be seen in FIG. 1, a regenerative control unit 11 is provided in the controller 2. A detection unit 12, a memory 13 and a power conversion circuit 14 are connected to the regenerative control unit 11.

The data of the step-on operating amount θ(t) detected by the operating amount sensor 8 is supplied to the regenerative control unit 11 and the section unit 12.

The detection unit 12 detects a change Δθ along with time in the step-on operating amount θ detected by the operating sensor 8. The change Δθ along with time is specifically a change in the step-on operating amount θ per unit time (unit in mm/sec), and corresponds to a step-on operating speed of the brake pedal 7.

The memory 13 stores, for example, a target value setting condition for setting a target value A(t) for the regenerative torque in accordance with the step-on operating amount θ detected by the operating amount sensor 8, and a time constant setting condition for setting a rise time constant ta of the regenerative torque in accordance with a change Δθ along with time, detected by the detection unit 12.

The power conversion circuit 14 extracts a power (generated by the motor) from the motor 3 in accordance with the regenerative torque instructed from the regenerative control unit 11, and takes the power therein. Then, the circuit converts the power into a direct current voltage, and output it as a voltage for charging the battery 1.

The regenerative control unit 11 has the following three main functions [1] to [3].

[1] The first setting unit for setting a target value A (t) of the regenerative torque in comparison between the step-on operating amount θ (t) detected by the operating amount sensor 8.

[2] The second setting unit for setting a rise time constant ta of the regenerative torque (that is, a rise speed of the regenerative torque) in comparison between a change Δθ along with time, detected by the detecting unit 12 and the time constant condition in the memory 13.

[3] Means for controlling a regenerative torque Tm(t) to be taken in the power conversion circuit 14 in accordance with the target value A(t) set by the first setting unit and the rise time constant ta of the torque (that is, the rise speed of the regenerative torque), set by the second setting unit.

Figure 3:
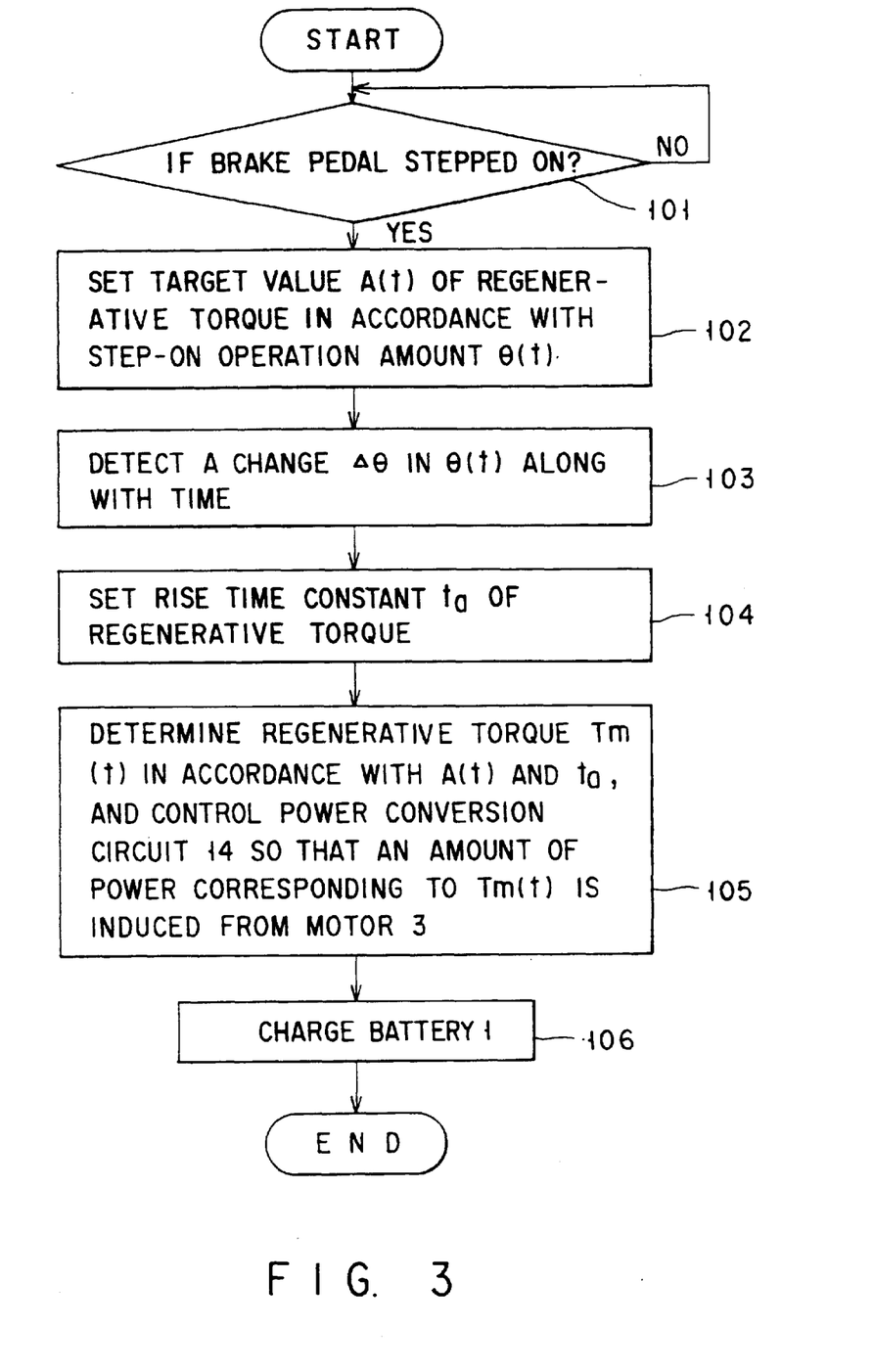
FIG. 3 is a flowchart designed to illustrate the effect of the first embodiment.

Next, the operation of the above-described structure will now be described with reference to the flowchart shown in FIG. 3.

When the brake pedal 7 is stepped on (that is, YES in step 101), the step-on operating amount θ(t) of the brake pedal 7 is detected by the operating amount sensor 8.

Figure 4:
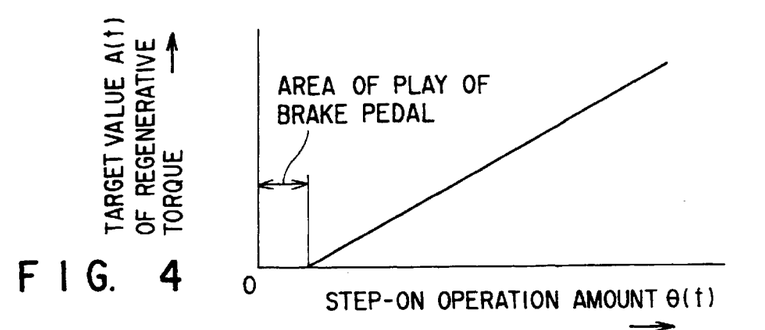
FIG. 4 is a diagram illustrating conditions for setting the target value of the regenerative torque in the first embodiment.

In comparison between the step-on operating amount θ(t) detected and the target value setting condition stored in the memory 13, shown in FIG. 4, a target value A(t) of the regenerative torque is set (step 102).

That is, there is a proportional relationship between the step-on operating amount θ(t) and the target value A(t) of the regenerative torque, and therefore as the step-on operating amount θ(t) becomes larger, the target value A(t) of the regenerative torque is set larger.

The change Δθ along with time, in the step-on operating amount θ(t) (change in unit time, that is, the step-on operating rate), is detected by the detecting unit 12 (step 103). In comparison between the detected change Δθ in time, and the time constant setting condition stored in the memory 13, shown in FIG. 5, the rise time constant ta of the regenerative torque (that is, the rise speed of the regenerative torque) is set (step 104).

Figure 5:
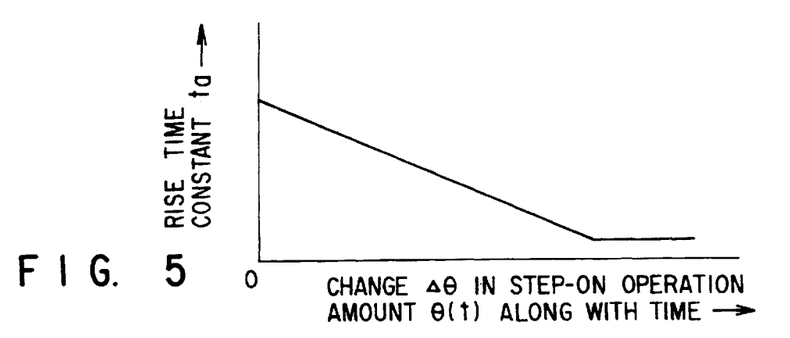
FIG. 5 is a diagram illustrating conditions for setting the rise time constant of the regenerative torque in the first embodiment.

In the case where the change Δθ along with time is at a predetermined value or less, there is an inverse proportional relationship between the change Δθ and the time constant ta, and more specifically, as the change Δθ is larger, in other words, as the step-on operating rate of the brake pedal 7 is faster, the rise time constant ta is set at a small value. When the change Δθ along with time, exceeds the predetermined value, the rise time constant ta is maintained at constant.

When the rise time constant ta is set, the calculation based on the following formula in which the rise time constant ta is used, is executed so as to obtain a torque gain Tg(t).

$$Tg(t) = 1 - e^{-t/ta}$$

Figure 6:
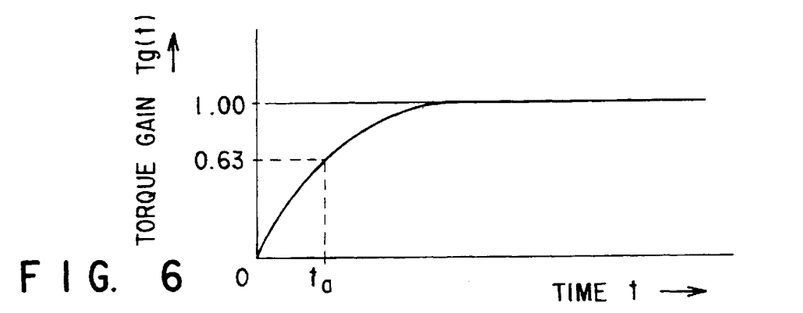
FIG. 6 is a diagram illustrating the gain of the regenerative torque in the first embodiment.

As can be understood from FIG. 6, the torque gain Tg(t) starts to rise by the rise time constant ta se as above, at the same time as the start of the step-on operation applied on the brake pedal 7.

Then, the following calculation is executed using the torque gain Tg(t) obtained and the target value A(t) of the regenerative torque, set as above, so as to determine the regenerative torque Tm(t) to be taken from the motor 3.

$$Tm(t) = A(t) \cdot Tg(t)$$
$$= A(t) \cdot (1 - e^{-t/ta})$$

When the regenerative torque Tm(t) is determined, the power conversion circuit 14 is controlled so that the power corresponding to the regenerative torque Tm(t) is extracted from the motor 3 (step 105). The power extracted from the motor 3 is DC-converted by the power conversion circuit 14, and used to charge the battery 1 (step 106).

Figure 7:
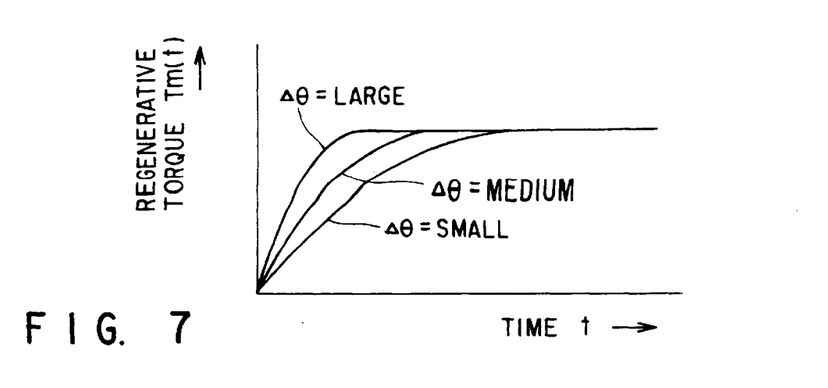
FIG. 7 is a diagram illustrating an example of a change in the regenerative torque in the first embodiment.

The regenerative torque Tm (t) contains a change in accordance with the rise time constant ta, and varies as shown in FIG. 7 on the basis of the change in Δθ the step-on operating amount θ(t) along with time, which serves as a parameter.

Thus, the time lag between when the step-on operation of the brake pedal 7 is started and when the regenerative torque Tm(t) reaches the target value A(t) is varied in accordance with the step-on state of the brake pedal 7. Consequently, the braking operation of the driver accurately reflects the timing of the regenerative brake, and a good brake response, in which the running status and a comfortable vehicle ride are considered, can be obtained. Therefore, the vehicle running safety and the comfortable ride can be improved.

In this embodiment, the torque gain Tg(t) is obtained from the rise time constant ta, and the regenerative torque Tm(t) is determined in accordance with the torque gain Tg(t) and the target value A(t) of the regenerative torque. However, it is also possible that the regenerative torque Tm(t–Δt) determined in the previous control loop is stored, and the rise time constant ta and the target value A(t) set in the present control loop are added to the stored value. Then, the following calculation is executed so as to determine the regenerative torque Tm(t).

$$Tm(t) = Tm(t - \Delta t) + \frac{t}{ta} \cdot (A(t) - Tm(t - \Delta t))$$

Moreover, in this embodiment, the change in the step-on operating amount θ(t) per unit time, (corresponding to the step-on operating rate of the brake pedal 7) is used as the change Δθ along with time, used for setting the rise time constant ta. However, it is also possible that the derivative value of the step-on operating amount θ(t) (corresponding to the acceleration speed of the step-on operation on the brake pedal 7) is used as the change Δθ along with time.

Next, the second embodiment of the present invention will now be described.

The structure of the main portion of an electric vehicle in connection with this embodiment is the same as that shown in FIG. 2; however the second embodiment is different from the first one partially in the structure of a controller 2 used for the regenerative torque control.

Figure 8:
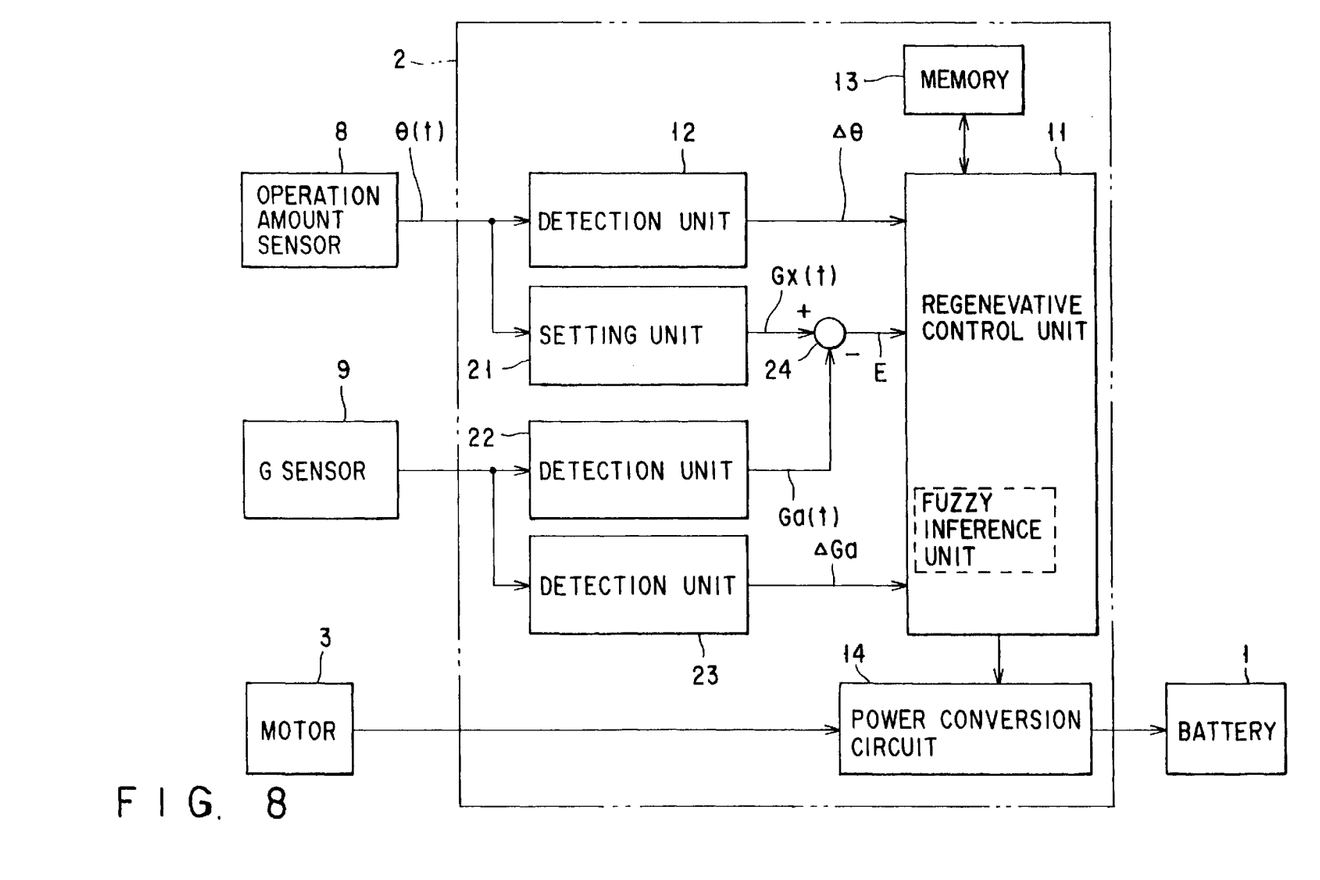
FIG. 8 is a block diagram showing a main portion of the second embodiment.

More specifically, as can be seen in FIG. 8, a setting unit 21 is provided on the controller 2, and the data of the step-on operating amount θ(t) detected by an operating amount sensor 8 is supplied to the setting unit 21. The setting unit 21 sets a target value Gx(t) (unit in G) of a vehicle deceleration speed in accordance with the step-on operating amount θ(t).

A G sensor 9 used for detecting the acceleration speed of the vehicle is provided, and an output from the G sensor 9 is supplied to a detection unit 22 and a detection unit 23 of the controller 2.

The detection unit 22 detects an actual vehicle deceleration speed Ga(t) (unit in G) from the output of the G sensor 9. The data of the vehicle deceleration speed Ga(t) detected is supplied to a subtraction unit 24 together with the target value Gx(t) of the vehicle deceleration speed, set as above.

The subtraction unit 24 calculates a deviation E (=Gx(t)–Ga(t)) between the target value Gx(t) of the vehicle deceleration speed, set as above, and the detected vehicle deceleration speed Ga(t). The data of the deviation E thus calculated is supplied to the regenerative control unit 11.

The detection unit 23 detects the change ΔGa in the vehicle deceleration speed Ga(t) along with time, from the output of the G sensor 9. The change ΔGa along with time, is, specifically, a change in the vehicle deceleration speed Ga(t) per unit time (unit in G/sec). The data of the change ΔGa along with time is supplied to the regenerative control unit 11.

The memory 13 stores a membership function and the format of the control rule, which will be described later.

The regenerative control unit 11 reads out a membership function for each of the input change Δθ, the deviation E and the change ΔGa, from the memory 13. This unit includes a fuzzy inference unit for determining a regenerative torque Tm(t) on the basis of these membership functions.

Figure 9:
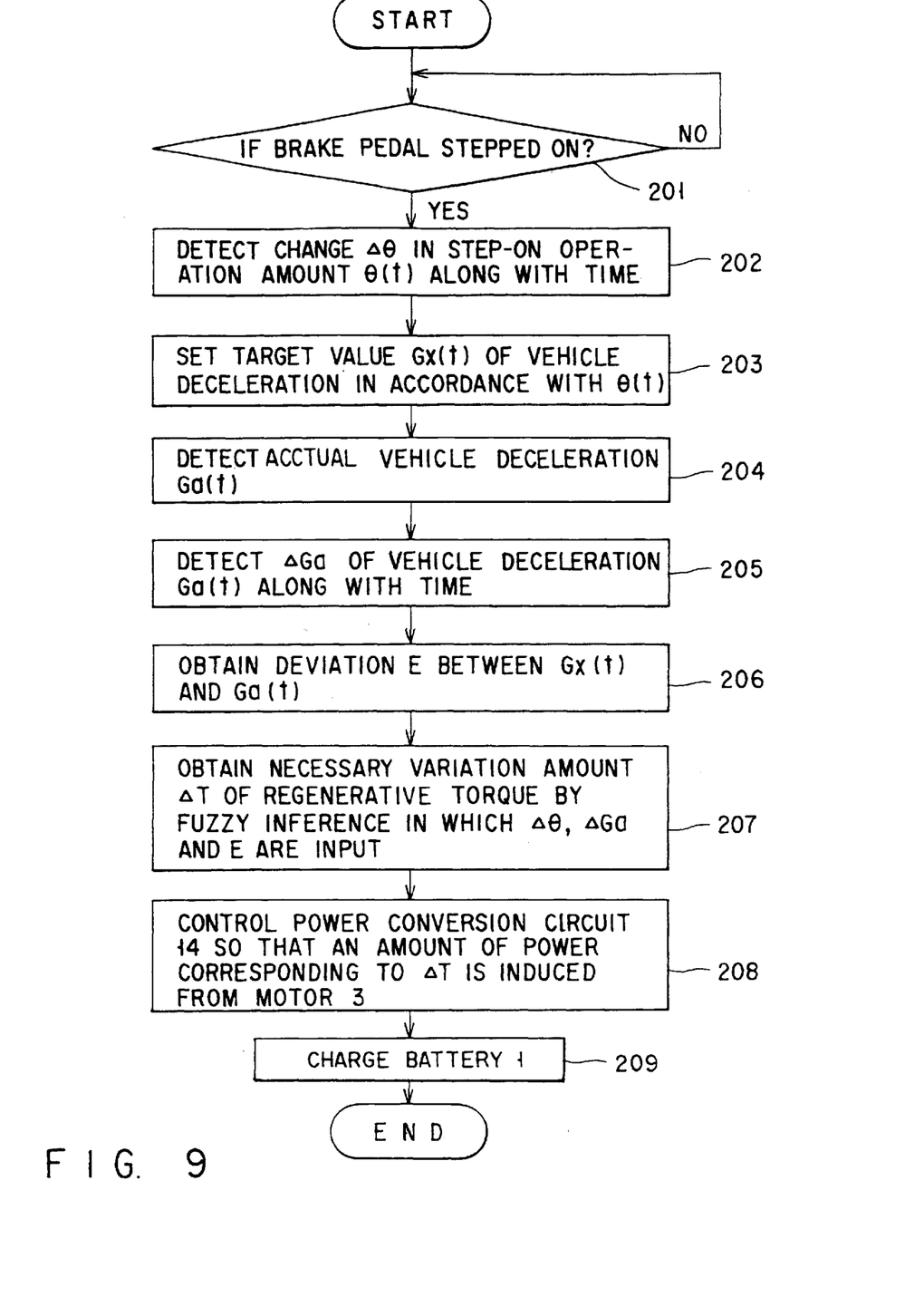
FIG. 9 is a flowchart designed to illustrate the effect of the second embodiment.

Next, the operation of the structure will now be described with reference to the flowchart shown in FIG. 9.

When the brake pedal 7 is stepped on (that is, YES in step 201), the step-on operating amount θ(t) of the brake pedal 7 is detected by the operating amount sensor 8.

The change Δθ in the step-on operating amount θ(t) detected along with time (change in unit time, that is, the step-on operating rate), is detected (step 202), and the target value Gx(t) of the vehicle deceleration speed is set in accordance with the step-on operating amount θ(t) (step 203).

At the same time, an actual vehicle deceleration speed Ga(t) is detected (step 204), and a change Δθ in the vehicle deceleration speed Ga(t) along with time (speed 205). Further, a deviation E between the target value Gx(t) of the vehicle deceleration speed and the (actual??) vehicle deceleration speed Ga(t) is obtained (step 206).

Figure 10:
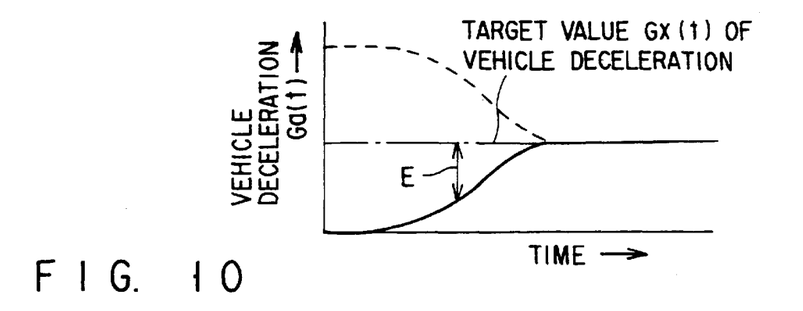
FIG. 10 is a diagram illustrating an example of a change in the vehicle deceleration speed in the second embodiment.
Figure 11:
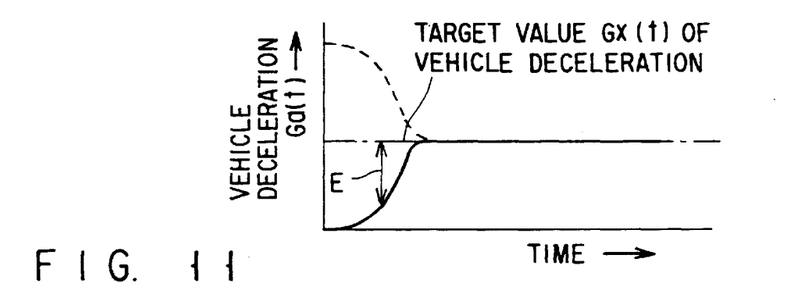
FIG. 11 is a diagram illustrating another example of a change in the vehicle deceleration speed in the second embodiment.
Figure 12:
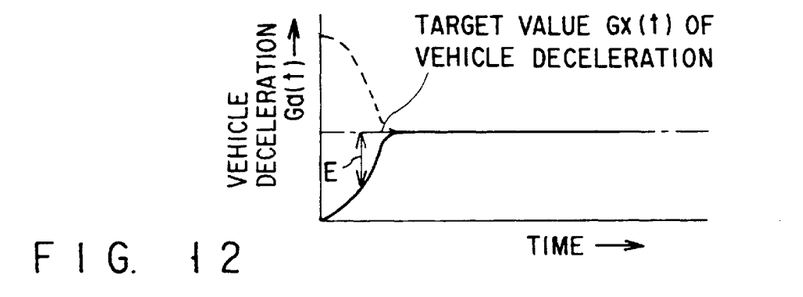
FIG. 12 is a diagram illustrating still another example of a change in the vehicle deceleration speed in the second embodiment.

Examples of the vehicle deceleration speed Ga(t) are shown in FIGS. 10, 11 and 12.

In the case where an inter-vehicle distance with respect to a vehicle running in front, is adjusted, the step-on operation of the brake pedal 7 is slowly performed. In this case, the vehicle deceleration speed Ga(t) varies slowly as can be seen in FIG. 10.

In the case where the vehicle is stopped at a crossing, the step-on operation on the brake pedal 7 is neither slow nor fast. In this case, the vehicle deceleration speed Ga(t) varies slowly as can be seen in FIG. 11.

In the case where the step-on operation on the brake pedal 7 is fast such as in an emergency situation, the vehicle deceleration speed Ga(t) varies slowly as can be seen in FIG. 12.

In the meantime, three membership functions corresponding the change Δθ along with time, the deviation E and the change ΔGa are prepared, and they are stored in the memory 13.

Figure 13:
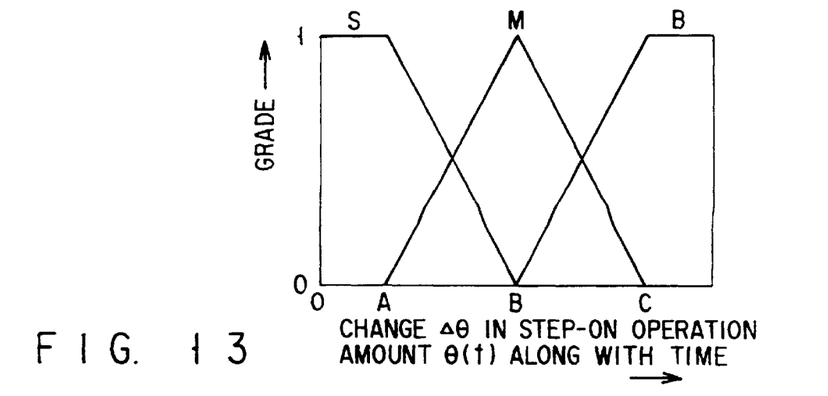
FIG. 13 is a diagram illustrating a shape of a membership function with regard to a change Δθ along with time, which is used in a fuzzy inference in the second embodiment.

The membership function for the change Δθ along with time, has a shape as can be seen in FIG. 13, in which there are three classes (S, M and B) in triangles and the input (change Δθ along with time) is classified into three sections (A, B and C).

Figure 14:
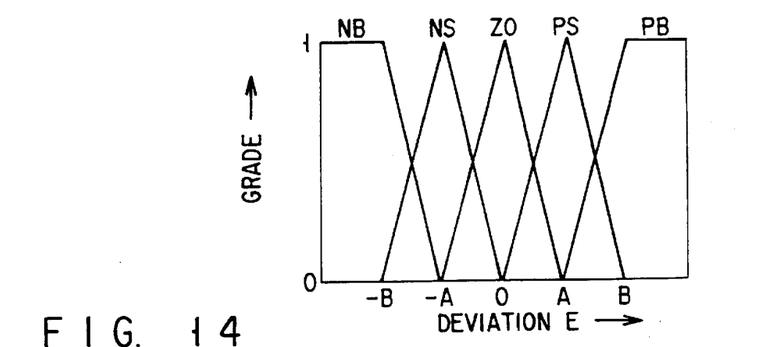
FIG. 14 is a diagram illustrating a shape of a membership function with regard to a deviation E, which is used in the fuzzy inference in the second embodiment.

The membership function for the deviation E has a shape as can be seen in FIG. 14, in which there are five classes (NB, NS, ZO, PS and PB) in triangles and the input (the deviation E) is classified into five sections (−B, −A, O, A and B).

Figure 15:
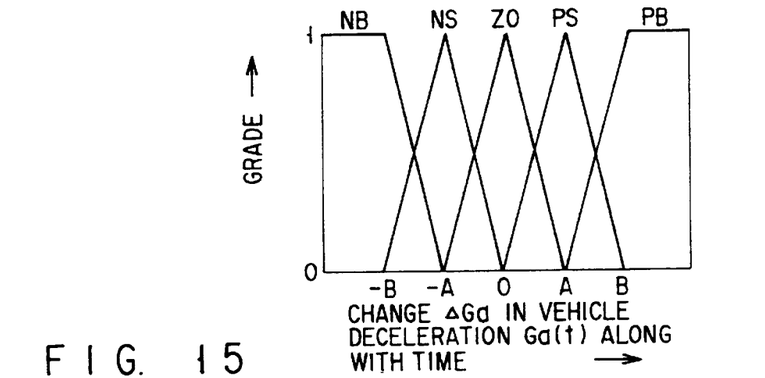
FIG. 15 is a diagram illustrating a shape of a membership function with regard to a change ΔGa along with time, which is used in the fuzzy inference in the second embodiment.

The membership function for the change $\Delta Ga$ along with time, has a shape as can be seen in FIG. 15, in which there are five classes (NB, NS, ZO, PS and PB) in triangles and the input (change $\Delta Ga$ along with time) is classified into five sections (−B, −A, 0, A and B).

In each of the membership functions, S indicates Small, M indicates Middle, B indicates Big, NB indicates Negative Big, ZO indicates Zero (neutral), PS indicates Positive Small, and PB indicates positive big.

When a change $\Delta\theta$ along with time, is actually input, a fuzzy parameter grade of the change $\Delta\theta$ is calculated from the change $\Delta\theta$ and the membership function shown in FIG. 13.

When a deviation E is input, a fuzzy parameter grade of the deviation E is calculated from the deviation E the membership function shown in FIG. 14.

When a change $\Delta Ga$ along with time, is input, a fuzzy parameter grade of the change $\Delta Ga$ is calculated from the change $\Delta Ga$ and the membership function shown in FIG. 15.

Figure 16:
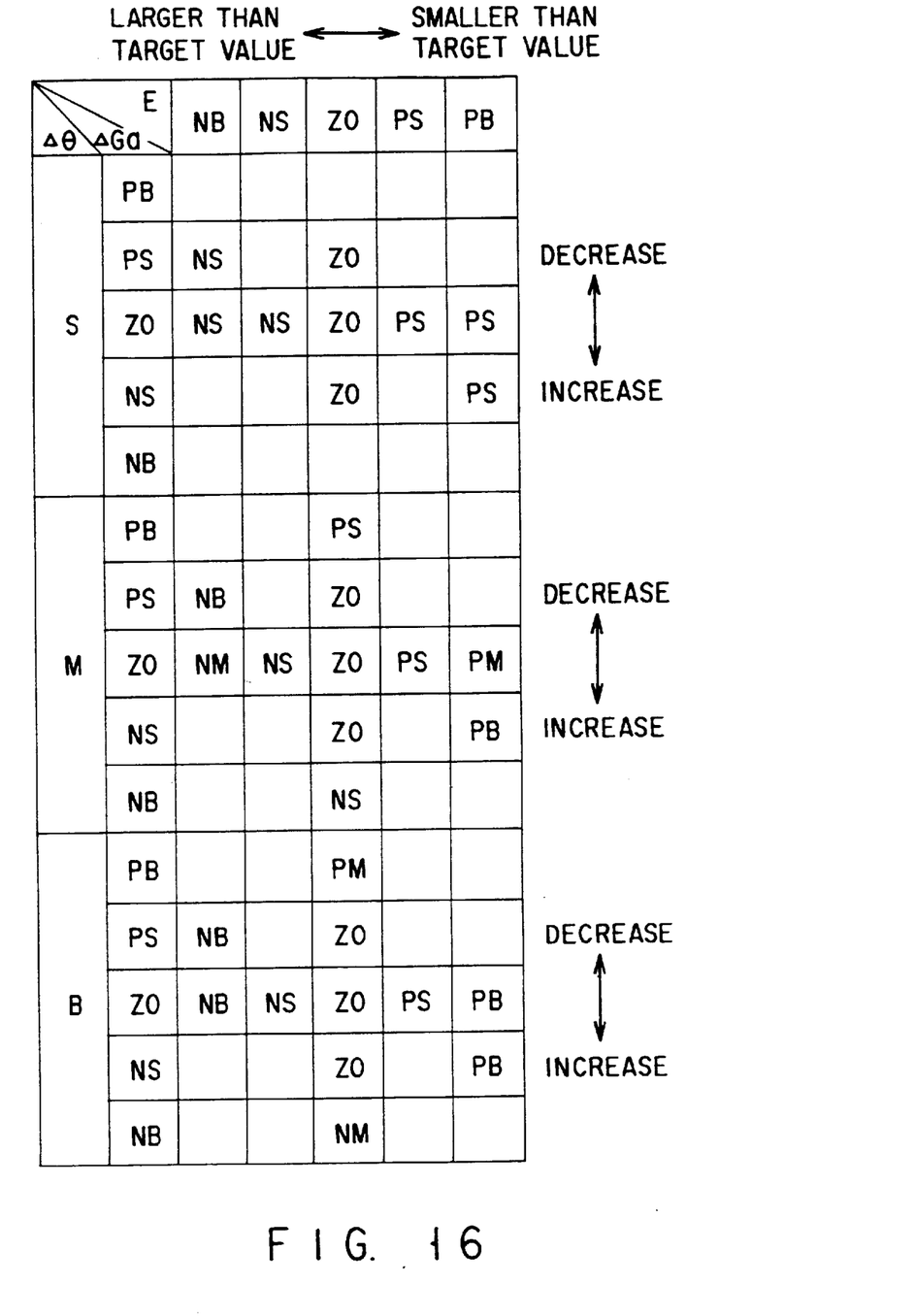
FIG. 16 is a diagram showing a format for a control rule, which is used in the fuzzy inference in the second embodiment.

The memory 13 further stores the format of the control rule shown in FIG. 16. The three fuzzy parameter grades calculated above are assigned to the control rule, and a fuzzy parameter grade for the necessary variation amount $\Delta T$ of the regenerative torque is obtained (i.e., the amount of regenerative torque to be varied is obtained) (step 207 up to this point).

Figure 17:
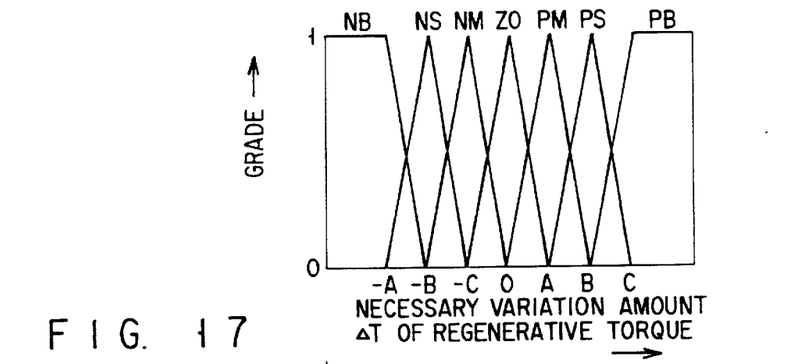
FIG. 17 is a diagram illustrating a shape of a membership function with regard to a necessary change amount ΔT of the regenerative torque, which is used in the fuzzy inference in the second embodiment.

The membership function for the necessary variation amount $\Delta\Delta T$ of the regenerative torque, has a shape as can be seen in FIG. 17, in which there are seven classes (NB, NS, NM, ZO, PM, PS and PB) in triangles and the output (the necessary variation amount $\Delta T$ of the regenerative torque) is classified into seven sections (−C, −B, −A, O, A, B and C). This function is stored in the memory 13. NM indicates Negative Middle and PM indicates Positive Middle.

A fuzzy parameter grade calculated for the obtained necessary variation amount $\Delta T$ of the regenerative torque is assigned to the membership function for the obtained necessary variation amount $\Delta T$ of the regenerative torque, and a sum-set calculation using the Min-Max method is carried out, thereby obtaining the necessary variation amount $\Delta T$ of the regenerative torque of the present status.

When a necessary variation amount $\Delta T$ is obtained, the power conversion circuit 14 is controlled so that an amount of the power corresponding to the necessary variation amount $\Delta T$ is extracted from the motor 3 (step 208).

More specifically, the power (the motor generating power) extracted from the motor 3 is varied by an amount corresponding to the necessary variation amount $\Delta T$. The power extracted from the motor 3 is DC-charged by the power conversion circuit 14, and used to charge the battery 1 (step 209).

Figure 18:
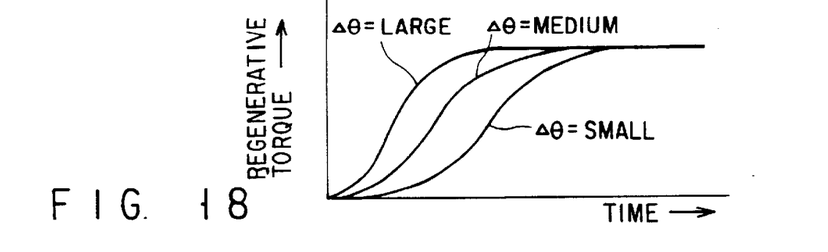
FIG. 18 is a diagram illustrating an example in the regenerative torque in the second embodiment.

The regenerative torque obtained from the motor 3 varies as shown in FIG. 18 on the basis of the change in $\Delta\theta$ the step-on operating amount $\theta(t)$ along with time, which serves as a parameter.

Thus, the necessary variation amount $\Delta T$ of the regenerative torque is obtained by a fuzzy inference, to which the step-on operation state of the brake pedal 7 (change $\Delta\theta$ along with time) and the vehicle running state which is based on the step-on operation state (deviation E between target value $Gx(t)$ of vehicle deceleration speed and actual vehicle deceleration speed $Ga(t)$, and change $\Delta\theta$ of vehicle deceleration speed $Ga(t)$) are input. The regenerative torque is controlled only by the necessary variation amount $\Delta T$. Consequently, not only the braking operation of the driver, but also the running status of the vehicle accurately reflect the timing of the regenerative brake, and a good brake response, in which the running status and a comfortable vehicle ride are considered, can be obtained. Therefore, the vehicle running safety and the comfortable ride can be improved.

In this embodiment, the change in the step-on operating amount $\theta(t)$ per unit time, (corresponding to the step-on operating rate of the brake pedal 7) is used as the change $\Delta\theta$ along with time. However, it is also possible that the derivative value of the step-on operating amount $\theta(t)$ (corresponding to the acceleration speed of the step-on operation on the brake pedal 7) is used as the change $\Delta\theta$ along with time. Further, it is also possible that the derivative value of the vehicle deceleration speed $Ga(t)$ is used as the change $\Delta\theta$ along with time, in place of a change in the vehicle deceleration speed $Ga(t)$ per unit time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A regenerative control apparatus of an electric vehicle, which obtains a regenerative torque for braking from a motor for running the vehicle, at the time of operation of the brake, said apparatus comprising:

first detection means for detecting an operating amount of the brake;

first setting means for setting a target value of the regenerative torque in accordance with the operating amount detected by said first detection means;

second detection means for detecting an operating rate of the brake pedal in accordance with a change of the operating amount detected by said first detection means per unit time second setting means for setting a rise speed of the regenerative torque, in accordance with the operating rate detected by said second detection means; and control means for controlling the regenerative torque in accordance with the target value of the regenerative torque set by said first setting means and the rise speed of the regenerative torque set by said second setting means.

2. An apparatus according to claim 1, wherein said rise speed is determined in accordance with a rise time constant of the regenerative torque.

3. An apparatus according to claim 2, wherein said first setting means set the target value of the regenerative torque in proportion to the operating amount detected by said first detection means.

4. An apparatus according to claim 2, wherein said second setting means sets the rise time constant of the regenerative torque to a value in inverse proportion to the operating rate detected by said second detection means when the operating rate is at a predetermined value or less, and sets the rise time constant to a constant value when the operating rate exceeds the predetermined value.

5. An apparatus according to claim 2, wherein said brake is a step-on type brake pedal, and said first detection means detects an step-on operating amount of said brake pedal.

6. An apparatus according to claim 2, further comprising:

a battery for outputting a power voltage used for driving said motor; and power conversion means for converting a power corresponding to the regenerative torque into a voltage used for charging said battery.

7. An apparatus according to claim 6, wherein said first setting means sets the target value of the regenerative torque in proportion to the operating amount detected by said first detection means.

8. An apparatus according to claim 6, wherein said second setting means sets the rise time constant of the regenerative torque to a value in inverse proportion to the operating rate detected by said second detection means when the operating rate is at a predetermined value or less, and sets the rise time constant to a constant value when the operating rate exceeds the predetermined value.

9. An apparatus according to claim 6, wherein said brake is a step-on type brake pedal, and said first detection means detects an step-on operating amount of said brake pedal.

* * * * *